United States Patent
Lee et al.

(10) Patent No.: US 7,897,280 B2
(45) Date of Patent: Mar. 1, 2011

(54) SAFETY KIT FOR SECONDARY BATTERY

(75) Inventors: Hyang Mok Lee, Seoul (KR); Byungjin Choi, Daejeon (KR); Jun Hwan Jang, Seoul (KR); Hyung Ku Yun, Daejeon (KR); Chang bum Ahn, Daejeon (KR); Hyun-Chul Jung, Incheon (KR); JeongSam Son, Daejeon (KR); Dong jun Kim, Daejeon (KR)

(73) Assignee: LG Chem, Ltd. (KR)

( * ) Notice: Subject to any disclaimer, the term of this patent is extended or adjusted under 35 U.S.C. 154(b) by 1097 days.

(21) Appl. No.: 11/617,279

(22) Filed: Dec. 28, 2006

(65) Prior Publication Data
US 2008/0008927 A1    Jan. 10, 2008

(30) Foreign Application Priority Data
Jul. 10, 2006   (KR) .................. 10-2006-0064163

(51) Int. Cl.
*H01M 10/0583* (2010.01)
*H01M 10/0585* (2010.01)

(52) U.S. Cl. ......... 429/152; 429/162; 429/246; 429/247; 429/136

(58) Field of Classification Search .................. None
See application file for complete search history.

(56) References Cited

U.S. PATENT DOCUMENTS 4,204,036 A * 5/1980 Cohen et al. ............... 429/152
5,534,368 A * 7/1996 Morris et al. ............... 429/152

FOREIGN PATENT DOCUMENTS

| KR | 10-2001-0082058 | 8/2001 |
| KR | 10-2001-0082059 | 8/2001 |
| KR | 10-2001-0082060 | 8/2001 |

* cited by examiner

*Primary Examiner* — Keith Walker
(74) *Attorney, Agent, or Firm* — Cantor Colburn LLP

(57) ABSTRACT

Disclosed herein is a sheet-shaped safety kit that is attached to opposite major surfaces of an electrode assembly for secondary batteries. The safety kit includes a group of metal sheets electrically connected to a cathode terminal of the electrode assembly, another group of metal sheets electrically connected to a cathode terminal of the electrode assembly, and an insulation sheet disposed between the two metal sheet groups. The metal sheets of one of the metal sheet groups are interconnected with each other at lower ends of the metal sheets, the lower-end interconnection part interconnecting the lower ends of the metal sheets has a width less than that of the metal sheets, and lower-end corners of the interconnected metal sheets are larger than lower-end corners of the metal sheets that are not interconnected with each other.

12 Claims, 3 Drawing Sheets

SAFETY KIT FOR SECONDARY BATTERY

FIELD OF THE INVENTION

The present invention relates to a safety kit for secondary batteries, and, more particularly, to a sheet-shaped safety kit that is attached to opposite major surfaces of an electrode assembly for secondary batteries, the safety kit including a group of metal sheets electrically connected to a cathode terminal of the electrode assembly, another group of metal sheets electrically connected to a cathode terminal of the electrode assembly, and an insulation sheet disposed between the two metal sheet groups, wherein the metal sheets of one of the metal sheet groups are interconnected with each other at lower ends of the metal sheets, the lower-end interconnection part interconnecting the lower ends of the metal sheets has a width less than that of the metal sheets, and lower-end corners of the interconnected metal sheets are larger than lower-end corners of the metal sheets that are not interconnected with each other.

BACKGROUND OF THE INVENTION

As mobile devices have been increasingly developed, and the demand of such mobile devices has increased, the demand of batteries has also sharply increased as an energy source for the mobile devices. Also, much research on batteries satisfying various needs has been carried out.

In terms of the shape of the batteries, the demand of prismatic secondary batteries or pouch-shaped secondary batteries, which are thin enough to be applied to products, such as mobile phones, is very high. In terms of the material for the batteries, the demand of lithium secondary batteries, such as lithium ion batteries and lithium ion polymer batteries, having high energy density, high discharge voltage, and high output stability, is very high.

FIG. 1 is an exploded perspective view typically illustrating the general structure of a conventional pouch-shaped secondary battery.

Referring to FIG. 1, a pouch-shaped secondary battery 100 includes an electrode assembly 300, electrode taps 310 and 320 extending from the electrode assembly 300, electrode leads 410 and 420 welded to the electrode taps 310 and 320, respectively, and a battery case 200 for receiving the electrode assembly 300.

The electrode assembly 300 is a power generating element comprising cathodes and anodes successively stacked one on another while separators are disposed between the respective cathodes and anodes. The electrode assembly 300 is constructed in a stacking structure or a stacking/folding structure. The electrode taps 310 and 320 extend from corresponding electrode plates of the electrode assembly 300. The electrode leads 410 and 420 are electrically connected to the pluralities of electrode taps 310 and 320 extending from the respective electrode plates of the electrode assembly 300, for example, by welding. The electrode leads 410 and 420 are partially exposed to the outside of the battery case 200. To the upper and lower surfaces of the electrode leads 410 and 420 is partially attached insulative film 430 for improving sealability between the battery case 200 and the electrode leads 410 and 420 and, at the same time, for accomplishing electrical isolation between the battery case 200 and the electrode leads 410 and 420.

The battery case 200 is made of an aluminum laminate sheet. The battery case 200 has a space for receiving the electrode assembly 300. The battery case 200 is formed generally in the shape of a pouch. In the case that the electrode assembly 300 is a stacking type electrode assembly as shown in FIG. 1, the inner upper end of the battery case 200 is spaced apart from the electrode assembly 300 such that the plurality of anode taps 310 and the plurality of cathode taps 320 can be coupled to the electrode leads 410 and 420, respectively.

In the pouch-shaped secondary battery 100 with the above-stated construction, the electrode assembly 300 is mounted in the battery case, which has low mechanical strength. As a result, there is much possibility that the pouch-shaped secondary battery 100 is easily deformed when external impacts are applied to the battery or the battery drops, and short circuits occur inside the battery when the battery is deformed. Especially, the lower-end corners of the battery case 200 are weak, and therefore, when strong impacts are applied to the lower-end corners of the battery case 200 or the battery drops with any one of the lower-end corners of the battery case 200 down, there is further increased the possibility that short circuits occur inside the battery.

Consequently, the demand of a technology for preventing abrupt flow of electric current and catching fire or explosion of the battery due to short circuits occurring inside the battery as a result of the penetration of a needle-shaped body into the battery, which frequently occurs, as well as the dropping and vibration of the battery, and more efficiently securing the safety of the battery is very high.

SUMMARY OF THE INVENTION

Therefore, the present invention has been made to solve the above-mentioned problems, and other technical problems that have yet to be resolved.

Specifically, it is an object of the present invention to provide a safety kit that is capable of preventing the occurrence of short circuits in a battery due to the dropping of the battery and the occurrence of short circuits in the battery due to the pressing or penetration of a needle-shaped body against or into the battery, thereby improving the safety of the battery.

It is another object of the present invention to provide a safety kit that is capable of further improving the safety of a battery even when the battery drops with any one of corners of the battery down.

It is yet another object of the present invention to provide a lithium secondary battery including the above-described safety kit.

In accordance with one aspect of the present invention, the above and other objects can be accomplished by the provision of a sheet-shaped safety kit that is attached to opposite major surfaces of an electrode assembly for secondary batteries, comprising: a group of metal sheets (sheets A) electrically connected to a cathode terminal of the electrode assembly; another group of metal sheets (sheets B) electrically connected to a cathode terminal of the electrode assembly; and an insulation sheet disposed between the two metal sheet groups, wherein the metal sheets of one of the metal sheet groups (the sheets A or the sheets B) are interconnected with each other at lower ends of the metal sheets, the lower-end interconnection part interconnecting the lower ends of the metal sheets has a width less than that of the metal sheets, and lower-end corners of the interconnected metal sheets (the sheets A or the sheets B) are larger than lower-end corners of the metal sheets that are not interconnected with each other (the sheets B or the sheets A).

Although a secondary battery has excellent performance, the secondary battery has a safety-related problem. For example, when an external object, such as a needle-shaped body, is pressed against or penetrated into the battery, cathodes of the battery are brought into contact with anodes of the battery, whereby short circuits occur in the battery. When the short circuits occur in the battery, the temperature of the battery is abruptly increased due to the reaction of electrode active materials. Especially, the cathode active material, such as lithium transition metal oxide, having low electrical conductivity generates a large amount of heat when the short circuits occur in the battery. As a result, the battery may catch fire or explode.

In the case that the safety kit according to the present invention is attached to the opposite major surfaces of the electrode assembly, on the other hand, the metal sheets of the safety kit are brought into contact with each other first, when the needle-shaped body is pressed against or penetrated into the battery, and therefore, short circuits occur in the battery with the result that the electrical conduction is accomplished. However, no electrode active material is applied to the metal sheets of the safety kit. Consequently, the amount of heat generated due to the short circuits is relatively small, and therefore, the safety of the battery is improved.

In order that such prior short circuits occur, as described above, the two groups of metal sheets, to which no electrode active material is applied, of the safety kit are connected to the cathode and anode terminals of the battery while the insulation sheet is disposed between the two groups of metal sheets.

Consequently, the safety kit according to the present invention covers the opposite major surfaces of the electrode assembly while the two groups of metal sheets are connected to the cathodes and the anodes of the electrode assembly, respectively, and therefore, when the needle-shaped body is penetrated into the battery, the safety kit causes minute short circuits in the battery, whereby the battery is prevented from catching fire or exploding.

Furthermore, the safety kit is connected to the electrode terminals of the electrode assembly while the safety kit covers the lower end of the electrode assembly. Consequently, it is possible to restrain the increase of the resistance inside the battery due to the movement of the electrode plates of the electrode assembly when external impacts are applied to the battery, thereby preventing the degradation of the performance of the battery and the decrease of the service life of the battery. In addition, it is possible to easily handle the electrode assembly during the assembly of the battery, thereby further improving the productivity of the battery.

Also, it is possible to prevent the occurrence of short circuits inside the battery even when the battery drops with corners down, which frequently occurs, thereby securing the safety of the battery against external impacts.

In a preferred embodiment, the two groups of metal sheets of the safety kit may be made of the same material as current collectors constituting the cathodes and the anodes of the electrode assembly. For example, the sheets A may be made of aluminum foil to which no active material is applied, and the sheets B may be made of copper foil to which no active material is applied. The copper has higher softness than that of the aluminum. Consequently, the copper sheets B of the safety kit are constructed in an integrated structure in which the copper sheets are integrally connected with each other at the lower ends of the copper sheets, whereas the aluminum sheets A are constructed in a separated structure in which the aluminum sheets are separated from each other.

Both the two groups of metal sheets of the safety kit may be constructed in an integrated structure in which the respective groups of metal sheets are integrally connected with each other. In this case, however, it is difficult to bend the two groups of metal sheets, which is necessary to cover the outer surface of the electrode assembly, and, when the two groups of metal sheets are bent, the metal sheets may be separated from the insulation sheet due to the difference in deformation size at the bent parts of the two groups of metal sheets. Consequently, this structure is not preferable.

In the safety kit according to the present invention, the lower-end corners of the metal sheets may be rounded so as to prevent the occurrence of short circuits due to the change in shape of the battery when the battery drops with corners down. For example, when the lower ends of the sheets B are interconnected with each other as in the above-described preferred embodiment, the lower-end corners of the sheets B are constructed in a rounded structure, and the lower-end corners of the sheets A are also constructed in a rounded structure at the position corresponding to the lower-end corners of the sheets B.

In this example, the lower-end corners of the sheets B may be constructed in a rounded structure having a radius less than that of the lower-end corners of the sheets A. Specifically, the lower-end corners of the sheets B are constructed in a rounded structure having a relatively small radius, whereas the lower-end corners of the sheets A are constructed in a gently rounded structure having a relatively large radius. Consequently, when viewing the safety kit with the above-stated construction in front of the sheets A, the lower-end corners of the safety kit have a structure in which the corners of the sheets B are extended a predetermined length from the corners of the sheets A. In the case that the lower-end corners of the safety kit are constructed such that the lower-end corners of the sheets A are larger than those of the sheets B, on the other hand, the lower-end corners of the sheets B may be bent, when the battery is deformed due to external impacts applied to the battery. As a result, the bent lower-end corners of the sheets B may be penetrated through the insulation sheet, and therefore, the sheets B may be brought into contact with the sheets A. For this reason, it is preferable to apply the corner structure according to the above-described example to the safety kit.

In the safety kit according to the present invention, the width of the lower-end interconnection part may be 10 to 95% of the width of the metal sheets. The lower-end interconnection part is a region that is bent when the safety kit is attached to the electrode assembly. Consequently, when the width of the lower-end interconnection part is too small, there is a great possibility that the lower-end interconnection part is damaged or broken during the bending of the lower-end interconnection part or when external impacts are applied to the lower-end interconnection part. When the width of the lower-end interconnection part is too large, on the other hand, there is a great possibility that short circuits of the safety kit occur when the battery drops with corners down or when external impacts are applied to the battery. The preferable width of the lower-end interconnection part is 60 to 90% of the width of the metal sheets.

Preferably, the lower-end corners of the sheets B are larger by approximately 1 mm to 6 mm than those of the sheets A. When the lower-end corners of the sheets B are too small, there is a great possibility that short circuits occur at the lower-end corners of the sheets B when the battery drops with corners down or when external impacts are applied to the battery. When the lower-end corners of the sheets B are too large, on the other hand, there is a great possibility that the prior short circuits do not occur at the corresponding regions when the needle-shaped body is pressed against or penetrated into the battery, whereby it is difficult to secure the safety of the battery.

In a preferred embodiment, the safety kit may further include another insulation sheet, having a predetermined size, attached to the lower-end interconnection part at the surface of the lower-end interconnection part where the lower-end interconnection part comes into contact with the electrode assembly. In the specification, the insulation sheet disposed between the sheets A and the sheets B is also referred to as a first insulation sheet, and the insulation sheet attached to the lower end interconnection part is also referred to as a second insulation sheet.

When the safety kit is attached to the outer surface of the electrode assembly, the second insulation sheet serves to prevent the occurrence of short circuits between the inner metal sheets of the safety kit and the outermost electrodes of the electrode assembly at the bent region of the safety kit. Consequently, the predetermined size of the second insulation sheet may be a size sufficient to partially cover the lower ends of the separated metal sheets.

The first insulation sheet and the second insulation sheet may be made of the same material. The material for the first insulation sheet and the second insulation sheet is not particularly restricted so long as the first insulation sheet and the second insulation sheet are made of an insulative material. Preferably, the insulation sheets are made of a non-porous material having a thermal contractibility less than that of separators of the electrode assembly. This is to prevent the insulation sheets from being contracted by heat generated during the charge and discharge or the operation of the battery.

In accordance with another aspect of the present invention, there is provided a lithium secondary battery including an electrode assembly mounted in a battery case in a sealed state while the electrode assembly is covered by the safety kit with the above-stated construction.

The electrode assembly is not particularly restricted so long as the electrode assembly has a structure in which a plurality of electrode taps are interconnected with each other so as to constitute cathodes and anodes of the electrode assembly. Preferably, the electrode assembly may be a stacking or stacking/folding type electrode assembly. The stacking type electrode assembly is well known in the technical art to which the present invention pertains, and therefore, a detailed description thereof will not be given. The details of the stacking/folding type electrode assembly are disclosed in Korean Unexamined Patent Publication No. 2001-0082058, No. 2001-0082059, and No. 2001-0082060, which have been filed in the name of the applicant of the present patent application. The disclosures of the above-mentioned patent publications are hereby incorporated by reference as if fully set forth herein.

Preferably, the metal sheets of the safety kit are connected to electrode leads, respectively, to which electrode taps of the electrode assembly are connected. In this case, the electrode taps may be connected to the corresponding electrode leads in various manners. Preferably, the electrode taps may be more stably connected to the corresponding electrode leads by welding.

The metal sheets of the safety kit are connected to the electrode leads, to which the electrode taps of the electrode assembly are connected, while the metal sheets covers the outer surface of the electrode assembly. In this case, the electrode taps may be connected to the corresponding electrode leads in various manners. Preferably, the electrode taps may be more stably connected to the corresponding electrode leads by welding. Also, taps protruding from the metal sheets may be connected to the electrode taps or the electrode leads by welding.

Preferably, the present invention may be applied to a pouch-shaped battery having an electrode assembly mounted in a pouch-shaped case made of a laminate sheet including a metal layer and a resin layer, such as an aluminum laminate sheet.

Preferably, the safety kit covers the electrode assembly such that the integrated type metal sheets, which are interconnected with each other at the lower ends thereof, are exposed to the outside. Specifically, the safety kit is constructed in a structure in which the second insulation sheet, the separated type metal sheets, the first insulation sheet, and the integrated type metal sheets are sequentially stacked one on another in the direction in which the safety kit is in contact with the electrode assembly.

In the present invention, when the safety kit is attached to the electrode assembly, the upper ends and the lower ends of the metal sheets mean regions corresponding to the upper end, from which the electrode taps of the electrode assembly protrude, and lower end of the electrode assembly, respectively.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
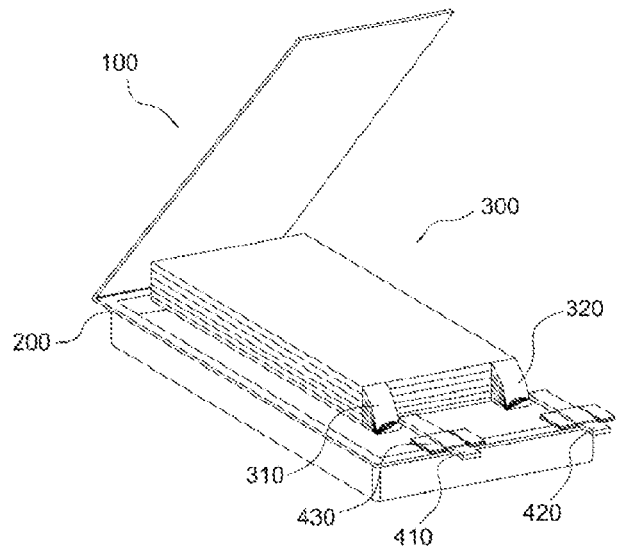
FIG. 1 is an exploded perspective view illustrating the general structure of a conventional pouch-shaped secondary battery.
Figure 2:
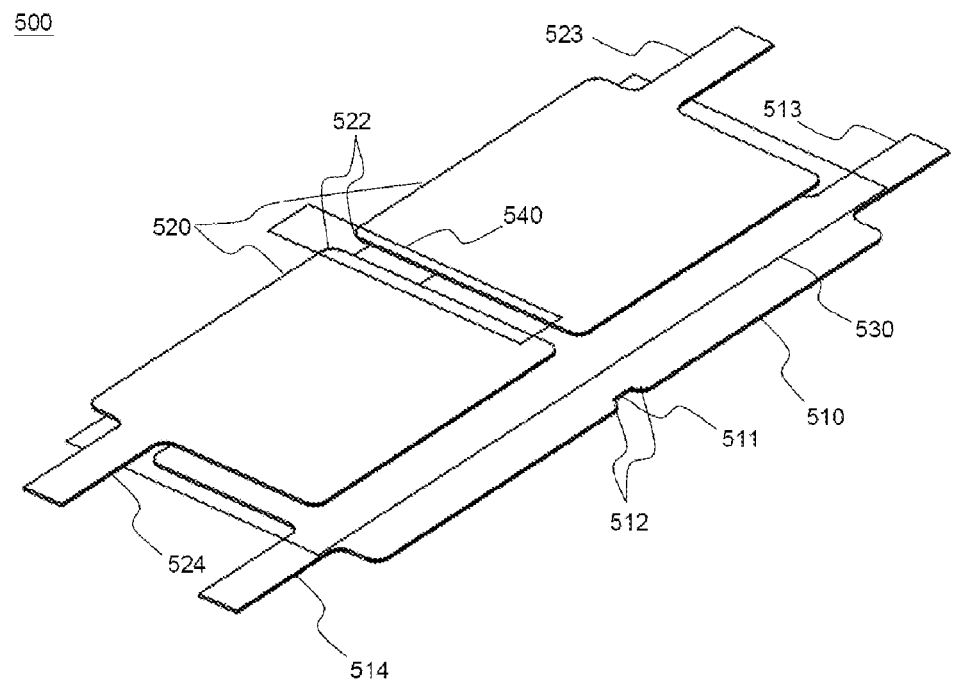
FIG. 2 is an exploded perspective view illustrating a safety kit according to a preferred embodiment of the present invention.

FIG. 2 is an exploded perspective view typically illustrating a safety kit according to a preferred embodiment of the present invention. For convenience of description, ends of metal sheets constituting the safety kit from which taps protrude will be hereinafter referred to as "upper ends."

Referring to FIG. 2, a safety kit 500 includes copper sheets 510, aluminum sheets 520, and two insulation sheets 530 and 540. The copper sheets 510 are constructed in an integrated structure in which the copper sheets 510 are integrally connected with each other via a lower-end interconnection part 511. The aluminum sheets 520 are constructed in a separated structure in which the aluminum sheets 520 are separated from each other. The copper sheets 510 and the aluminum sheets 520 are rounded at opposite-side corners 512 and 522 of the lower ends thereof. The number of the rounded corners 512 and 522 is 4 for the respective metal sheets 510 and 520. The rounded structure of the corners 512 and 522 is shown in more detail in FIGS. 3 and 4, which are a front view and a partially enlarged view illustrating the safety kit of FIG. 2, respectively.

Figure 3:
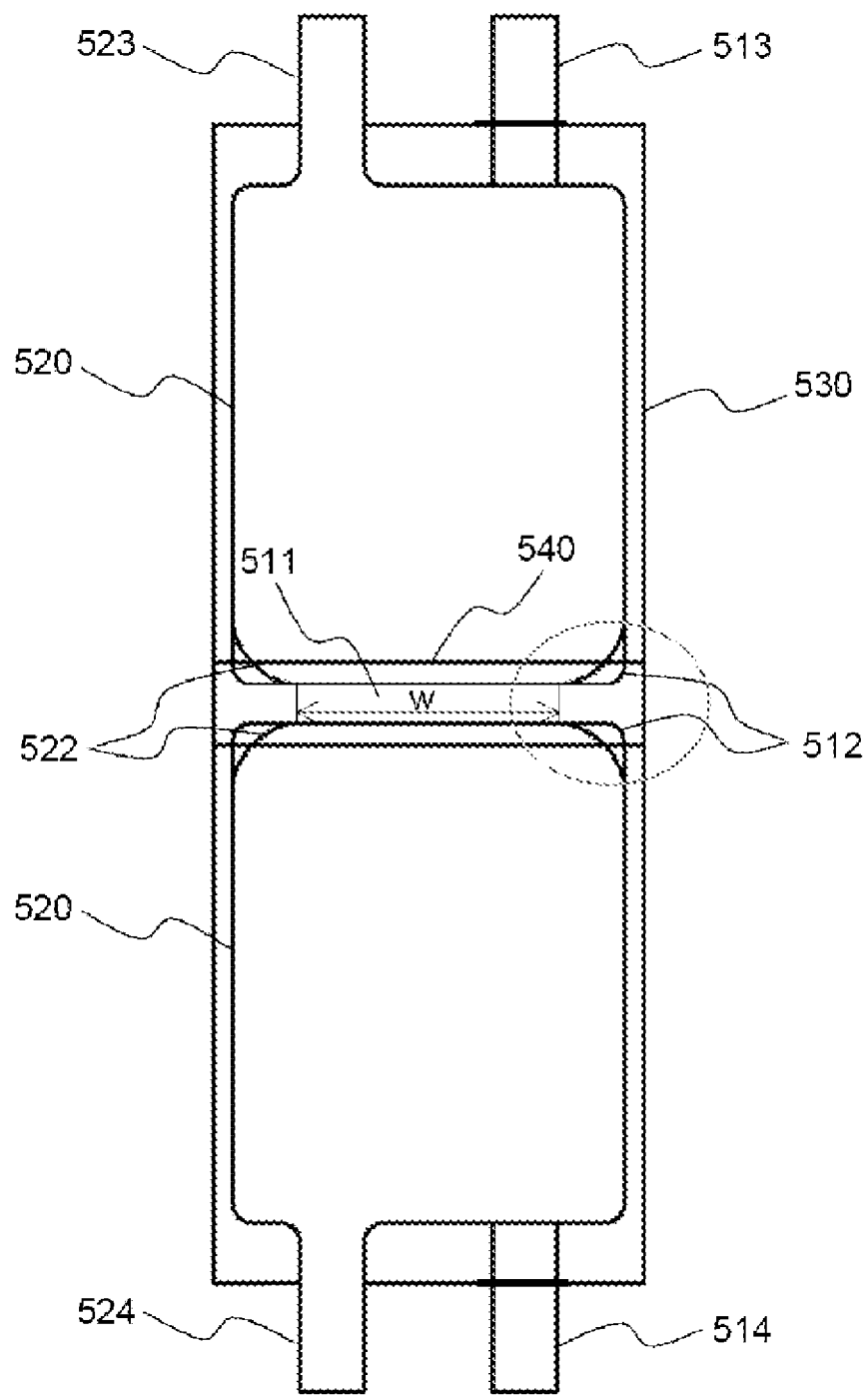
FIG. 3 is a front view of FIG. 2.
Figure 4:
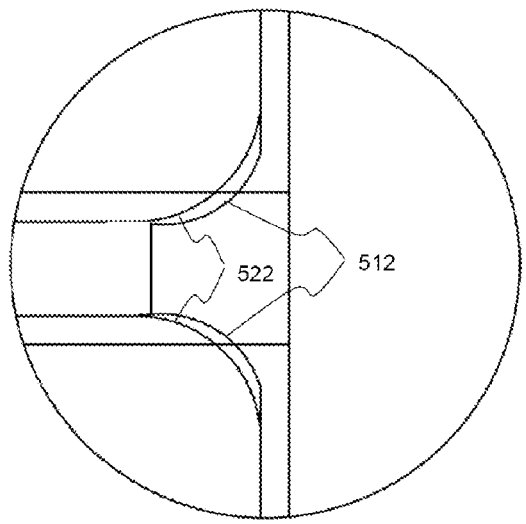
FIG. 4 is a partially enlarged view of FIG. 3.

Referring to these drawings, the corners 512 of the copper sheets 510 are larger than the corners 522 of the aluminum sheets 520. Consequently, when viewing the safety kit 500 in front of the aluminum sheets 520 as shown in FIG. 3, the corners 521 of the copper sheets 510 are partially exposed to the outside. Also, the interconnection part 511 interconnecting the copper sheets 510 is a region that is bent when the safety kit 500 is attached to an electrode assembly (not shown). The interconnection part 511 has a width w less than those of other regions.

Referring back to FIG. 2, the two insulation sheets of the safety kit 500 include a first insulation sheet 530 interposed between the copper sheets 510 and the aluminum sheets 520 and a second insulation sheet 540 to cover the lower ends of the respective aluminum sheets 520.

The first insulation sheet 530 has a size greater than that of the copper sheets 510 and the aluminum sheets 520 so as to prevent the contact between the copper sheets 510 and the aluminum sheets 520. The second insulation sheet 540 has a size sufficient to partially cover the lower end of the electrode assembly (not shown) so as to prevent the occurrence of short circuits which may be caused when the safety kit 500 comes into contact with the electrode assembly. The structure of the insulation sheets 530 and 540 is also shown in more detail in FIGS. 3 and 4.

The copper sheets 510 and the aluminum sheets 520 have taps 513, 514, 523, and 524 protruding from the upper ends thereof. The protruding taps 513, 514, 523, and 524 are connected to electrode taps of the electrode assembly (not shown). The structure in which the safety kit is attached to the electrode assembly will be described in detail with reference to FIG. 5.

The safety kit 500 is constructed in a shape to cover the opposite major surfaces and the lower end surface of the electrode assembly 300. The safety kit 500 is bent at the interconnection part 511 interconnecting the copper sheets 510 such that the safety kit 500 can be attached to the outer surface of the electrode assembly 300. From the upper end of the electrode assembly 300 protrude pluralities of anode taps 310 and cathode taps 320. The anode taps 310 and the cathode taps 320 are connected to the protruding taps 513 and 514 of the copper sheets 510 and the protruding taps 523 and 524 of the aluminum sheets 520, respectively. The protruding taps 513 and 514 of the copper sheets 510 are connected to the upper and lower end surfaces of the anode taps 310, respectively. The protruding taps 523 and 524 of the aluminum sheets 520 are connected to the upper and lower end surfaces of the anode taps 310, respectively.

The interconnection part 511 interconnecting the copper sheets 510, which is a bent part of the safety kit 500, is located at the lower end of the electrode assembly 300. Consequently, the lower end of the electrode assembly 300, at which short circuits frequently occur, is covered by the second insulation sheet 540 disposed at the interconnection part 511 when the safety kit 500 is attached to the electrode assembly 300. Also, the lower-end corners of the electrode assembly 300 are covered by only the first insulation sheet 530 due to the structure of the interconnection part 511 interconnecting the copper sheets 510, which has the relatively small width w, and the structure of the rounded lower-end corners 512 and 522 of the copper sheets 510 and the aluminum sheets 520.

Hereinafter, an example of the present invention will be described in detail. It should be noted, however, that the scope of the present invention is not limited by the illustrated example.

Example 1

Figure 5:
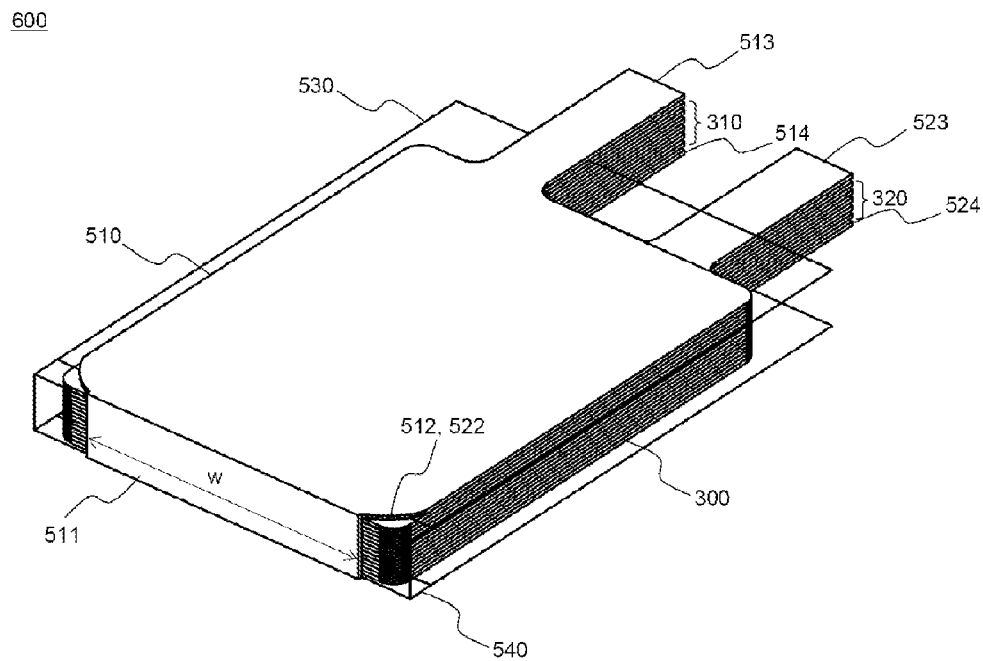
FIG. 5 is a perspective view illustrating an electrode assembly to which the safety kit of FIG. 2 is attached.

After a safety kit was manufactured as shown in FIG. 2, the safety kit was attached to an electrode assembly such that the outer surface of the electrode assembly was covered by the safety kit as shown in FIG. 5, and the electrode assembly having the safety kit attached thereto was mounted in a pouch-shaped battery case. Subsequently, an electrolyte was injected into the battery case, and then the battery case was sealed. In this way, the manufacture of a battery was completed.

Comparative Example 1

A battery was manufactured in the same manner as Example 1 except that no safety kit was attached to the outer surface of an electrode assembly.

Comparative Example 2

A battery was manufactured in the same manner as Example 1 except that a safety kit having a width of a lower-end interconnection part equal to that of metal sheets was attached to the outer surface of an electrode assembly.

Experimental Example 1

The batteries manufactured as described in Example 1 and Comparative examples 1 and 2 were tested. Specifically, the batteries fell while the corners of the batteries were downward, and needle-shaped bodies were penetrated into the batteries. The results of the tests are indicated in Table 1. The tests were repeatedly carried out for 20 batteries. Specifically, the tests of dropping the batteries with corners down were carried out such that six faces and four edges of the respective batteries dropped down 10 times and the corners of the respective batteries dropped down 20 times. The tests of penetrating the needle-shaped bodies into the batteries were carried out in the condition that the diameter of the needle-shaped bodies was 2 mm and the penetrating speed of the needle-shaped bodies was 1 m/min.

TABLE 1

|  | Number of batteries short-circuited after dropping of batteries | Number of batteries having caught fire after penetrating needle-shaped bodies into batteries |
|---|---|---|
| Example 1 | 0 | 0 |
| Comparative example 1 | 3 | 15 |
| Comparative example 2 | 6 | 0 |

As can be seen from Table 1, short circuits did not occur in any of the batteries of Example 1 according to the present invention when the batteries dropped with corners down. Specifically, the lower-end interconnection part of the safety kit covering the electrode assembly had a width less than that of the metal sheets, and therefore, the short circuits did not occur in the batteries when the batteries dropped. When the needle-shaped bodies were penetrated into the batteries, the two groups of metal sheets of the safety kit caused the occurrence of prior short circuits in the batteries, and therefore, the increase of the temperature of the batteries is effectively prevented. Consequently, all the batteries, i.e., 20 batteries, did not catch fire.

In the case of the batteries of Comparative example 1, a large number of batteries were short-circuited and caught fire. In the case of the batteries of Comparative example 2, on the other hand, the batteries did not catch fire when the needle-shaped bodies were penetrated into the batteries, but the corresponding metal sheets of the safety kit were brought into contact with each other when the batteries dropped with corners down, whereby short circuits occurred in the batteries. However, the short circuits caused in the batteries of Comparative example 2 provided a relatively small amount of heat generation as compared with the short circuits caused in the batteries of Comparative example 1.

INDUSTRIAL APPLICABILITY

As apparent from the above description, the safety kit according to the present invention has the effect of preventing the occurrence of short circuits in a battery due to the dropping of the battery and the occurrence of short circuits in the battery due to the pressing or penetration of a needle-shaped body against or into the battery. Furthermore, the safety kit according to the present invention has the effect of further improving the safety of the battery even when the battery drops with any one of corners of the battery down.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A sheet-shaped safety kit configured to be attached to opposite major surfaces of an electrode assembly for secondary batteries, comprising:
    first pair of metal sheets including a first upper sheet and a first lower sheet;
    a interconnection part having a first edge and a second edge substantially parallel to each other, wherein the first edge and the second edge are connected to the first upper sheet and the first lower sheet of the first pair of metal sheets, respectively;
    a second pair of metal sheets including a second upper sheet and a second lower sheet, wherein the second upper sheet and the second lower sheet of the second pair of metal sheets are oppositely disposed substantially adjacent to the first upper sheet and the second upper sheet of the first pair of metal sheets, respectively; and
    an insulation sheet including an upper portion disposed between the first upper sheet and the second upper sheet and a lower portion disposed between the first lower sheet and the second lower sheet,
    wherein the fist pair of metal sheets are connected to one of a cathode terminal and an anode terminal of the electrode assembly and the second pair of metal sheets are connected to the other of the cathode terminal and the anode terminal of the electrode assembly when the sheet-shaped safety kit is attached to the electrode assembly,
    wherein a length of the interconnection part in a direction substantially parallel to the first edge of the interconnection part is less than a length of the first pair of metal sheets in the direction substantially parallel to the first edge of the interconnection part and a length of the second pair of metal sheets in the direction substantially parallel to the first edge of the interconnection part, and
    wherein corners of the first pair of metals sheets adjacent to the interconnection part are formed in a arc shape having a first curvature radius, and corners of the second pair of metal sheets adjacent to the interconnection part are formed in a arc shape having a second curvature radius substantially greater than the first curvature radius.

2. The sheet-shaped safety kit according to claim 1, wherein
    the first pair of metal sheets are made of aluminum foil to which no active material is applied and connected to a cathode terminal of the electrode assembly when the sheet-shaped safety kit is attached to the electrode assembly, and
    the second pair of metal sheets are made of copper foil to which no active material is applied and connected to the anode terminal of the electrode assembly when the sheet-shaped safety kit is attached to the electrode assembly.

3. The sheet-shaped safety kit according to claim 1, wherein
    the first pair of metal sheets are made of copper foil to which no active material is applied and connected to the anode terminal of the electrode assembly when the sheet-shaped safety kit is attached to the electrode assembly, and
    the second pair of metal sheets are made of aluminum foil to which no active material is applied, and connected to a cathode terminal of the electrode assembly when the sheet-shaped safety kit is attached to the electrode assembly.

4. The sheet-shapd safety kit according to claim 1, wherein the length of the interconnection part in the direction substantially parallel to the first edge of the interconnection part is in a range from about 60% to about 90% of the length of the first pair of metal sheets in the direction substantially parallel to the first edge of the interconnection part and the length of the second pair of metal sheets in the direction substantially parallel to the first edge of the interconnection part.

5. The sheet-shaped safety kit according to claim 1, wherein the second curvature radius is greater than the first curvature radius by approximately 1 mm to 6 mm.

6. The sheet-shaped safety kit according to claim 1, wherein the insulation sheet is made of a non-porous material having a thermal contractibility less than a thermal contractibility of separators of the electrode assembly.

7. The sheet-shaped safety kit according to claim 1, further comprising:
    an additional insulation sheet, having a predetermined surface area, disposed on portions of the second pair of metal sheets and substantially opposite to the first pair of metal sheets, wherein the additional insulation sheet is aligned with the interconnection part.

8. The sheet-shaped safety kit according to claim 7, wherein the additional insulation sheet and the insulation sheet disposed between the first pair of metal sheets and the second pair of metal sheets are made of a same material.

9. A lithium secondary battery comprising an electrode assembly disposed in a battery case in a sealed state, wherein the electrode assembly is covered by the sheet-shaped safety kit according to claim 1.

10. The lithium secondary battery according to claim 9, wherein
    the electrode assembly is a stacking type electrode assembly or a stacking/folding type electrode assembly, and
    the first pair of metal sheets and the second pair of metal sheets of the sheet-shaped safety kit are connected to electrode leads, respectively, to which electrode taps of the electrode assembly are connected.

11. The lithium secondary battery according to claim 9, wherein the battery case is a pouch-shaped case made of a laminate sheet including a metal layer and a resin layer.

12. The lithium secondary battery according to claim 9, wherein the sheet-shaped safety kit covers the electrode assembly such that the first pair of metal sheets are exposed to the outside.

* * * * *